Feb. 2, 1926. 1,571,584
C. M. JANES
SAFETY STOP LIGHT
Filed May 4, 1923  2 Sheets-Sheet 1
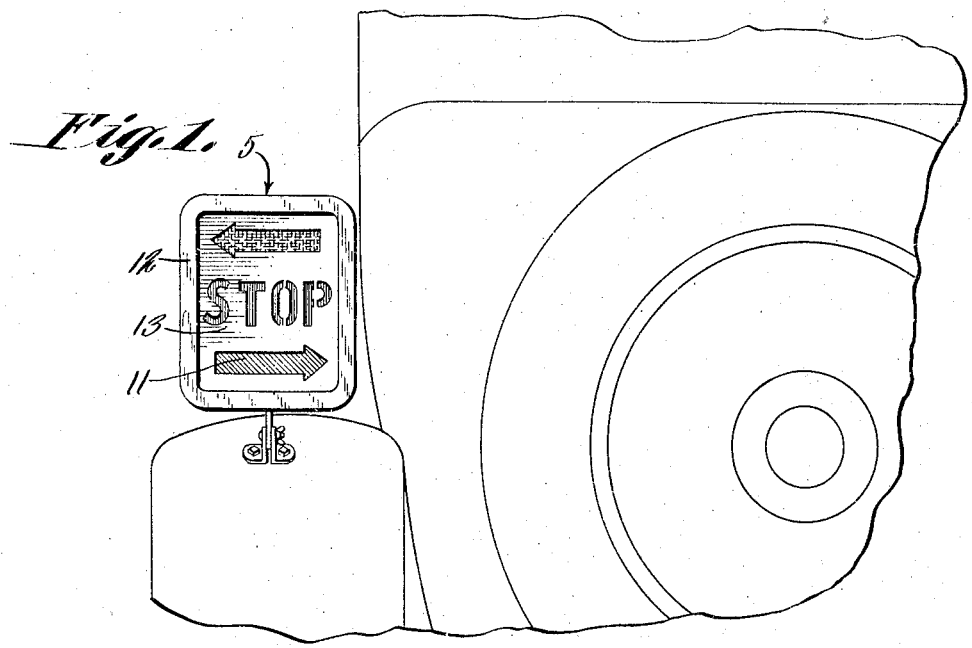
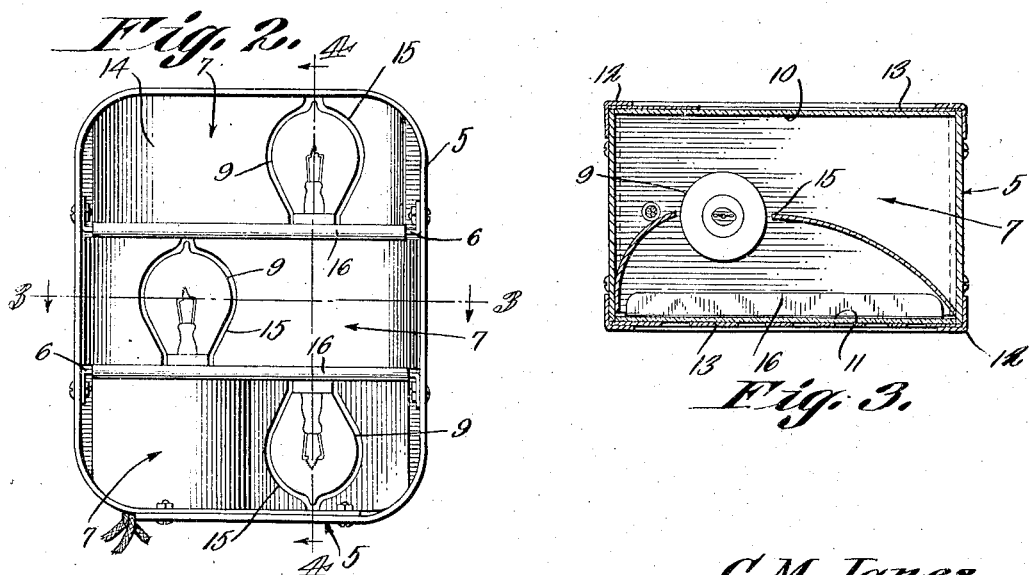
C. M. Janes,
Inventor.

Feb. 2, 1926. 1,571,584
C. M. JANES
SAFETY STOP LIGHT
Filed May 4, 1923   2 Sheets-Sheet 2
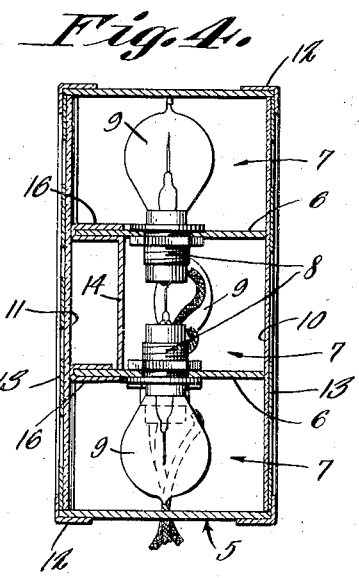
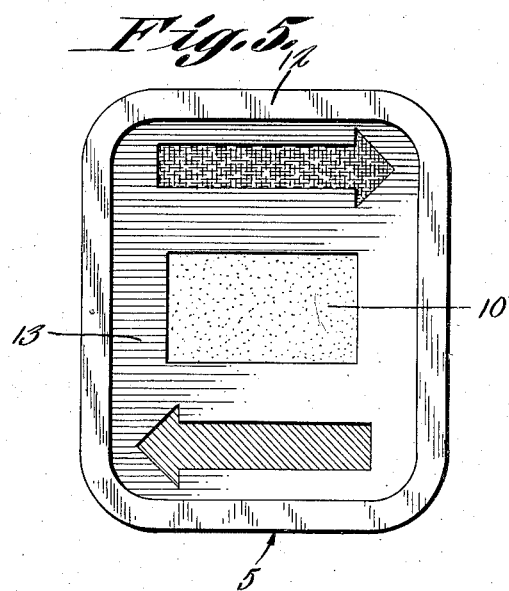
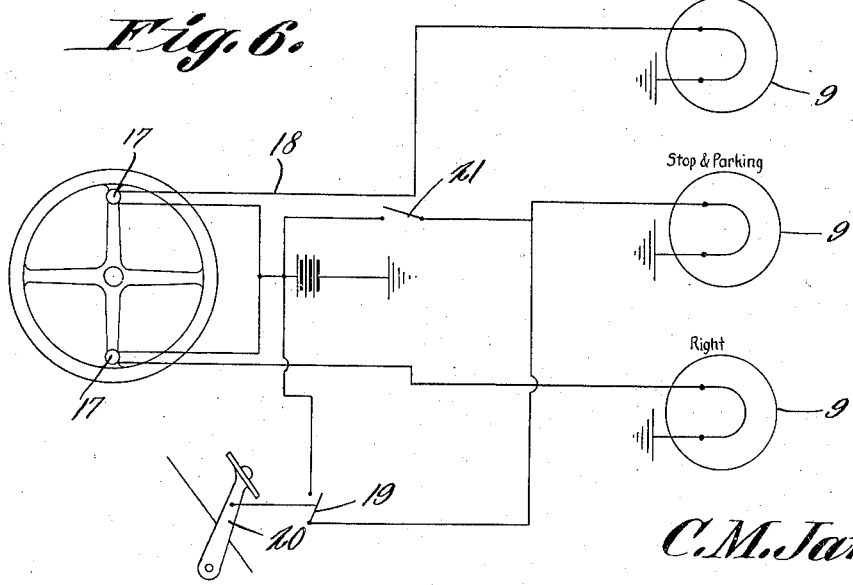
C. M. Janes,
Inventor.

Patented Feb. 2, 1926.

1,571,584

UNITED STATES PATENT OFFICE.

CLYDE M. JANES, OF PAWTUCKET, RHODE ISLAND.

SAFETY STOP LIGHT.

Application filed May 4, 1923. Serial No. 636,647.

*To all whom it may concern:*

Be it known that I, CLYDE M. JANES, a citizen of the United States, residing at Pawtucket, in the county of Providence and State of Rhode Island, have invented a new and useful Safety Stop Light, of which the following is a specification.

This invention relates to signaling devices and more particularly a signaling device especially designed for use on motor vehicles or the like, to indicate the direction of travel of the vehicle.

An object of the invention is to provide a signaling device of this character which will not only indicate direction of travel, but will also automatically operate as a stop signal, novel means being provided whereby the signaling device may also be employed as a parking lamp.

Another object of the invention is to provide a signaling device which may be readily observed by persons passing at the front of a vehicle equipped with the signaling device as well as from the rear thereof.

A still further object of the invention is to provide partitioning members within the lamp compartments, which partitioning members will act to reflect the light rays from the lamps positioned within the compartments, and at the same time shield the indicating character of one wall when the device is being viewed through the opposed wall.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a fragmental rear elevational view of a motor vehicle, disclosing the signaling device as positioned on the rear mud guard thereof.

Figure 2 is an elevational view of the signaling device, one wall thereof being removed.

Figure 3 is a sectional view taken on line 3—3 of Figure 2.

Figure 4 is a sectional view taken on line 4—4 of Figure 2.

Figure 5 is a front elevational view of the signaling device.

Figure 6 is a diagrammatical view disclosing the wiring system.

Referring to the drawings in detail, the device embodies a box-like structure indicated generally by the reference character 5, which box-like structure forms the body portion of the signal.

Partitioning members indicated at 6 divide the body portion into a plurality of lamp compartments 7, the partitioning members 6 being formed with suitable openings to accommodate the lamp sockets 8 in which the lamps 9 are supported. The front of the body portion is closed by means of the front wall 10 which is formed of suitable translucent material, the upper portion of the wall 10 being colored preferably yellow, while the intermediate portion thereof is frosted and the lower portion is colored green.

The rear wall indicated at 11 is also formed with translucent material, the upper portion thereof being colored yellow, the central portion thereof being colored red, while the lower portion is colored green.

These walls 10 and 11 are held in position by means of the frames 12 that also secure the plates 13 in position, the plates 13 being provided with suitable cut out portions defining letters or indicating characters such as arrows indicating the direction of travel of the vehicle supplied with the device.

The structure of the plates is such that the plate employed at the rear of the body portion has cut out portions intermediate its upper and lower edges defining the word "Stop", which cut out portions lie in proximity to that portion of the rear wall 11, colored red. The outline of arrows or indicating characters formed at the upper and lower edges of the rear wall fall opposite the portion of the wall colored yellow and green, the arrows extending in opposite directions to indicate direction of travel.

Dividing the lamp compartments into front and rear sections, are the reflectors 14 which are curved as clearly shown by Figure 3 of the drawings, the partitioning members being cut away at 15 to provide clearances for the lamps 9, which are arranged in staggered relation with respect to each other.

As shown, the lower and intermediate partitioning members 14 are formed with the flanges 16 that are folded into close engagement with the partitioning members 6, whereby the partitioning members 14 are secured in position.

The plate 13 positioned over the translucent front wall of the body portion is formed with a central cut out portion permitting the light rays from the lamp positioned in the central lamp compartment of the body portion to project its light rays therethrough.

In the use of the device, it is contemplated to provide switches 17 on the steering wheel of the vehicle, which switches control the circuits to the lamps through the wires 18, the circuit to the lamp disposed in the central compartment of the body portion being controlled by the switch member 19 operated automatically by movement of the brake pedal 20 to complete the circuit to the central lamp 9, when the brake pedal is operated.

In order that this central lamp 9 may be employed as a parking lamp, a manually controlled switch 21 is provided.

Having thus described the invention, what is claimed as new is:—

A signaling box including a body portion, partitioning members arranged within the body portion and providing an upper compartment, a lower compartment, and an intermediate compartment, curved partitioning members extending transversely of the compartments, the curved partitioning members in the lower compartment and intermediate compartment having flanges bent outwardly and inwardly to embrace portions of the first mentioned partitioning members and, the last mentioned partitioning members having cut out portions to receive lamp bulbs.

In testimony that I claim the foregoing as my own, I have hereto affixed my signature.

CLYDE M. JANES.